United States Patent
Lerchenmueller et al.

(10) Patent No.: US 9,618,529 B2
(45) Date of Patent: Apr. 11, 2017

(54) SENSOR DEVICE FOR THE CONTACTLESS ACQUISITION OF A ROTATION CHARACTERISTIC OF A ROTATABLE OBJECT

(71) Applicants: Klaus Lerchenmueller, Rettenberg (DE); Martin Lerner, Stuttgart (DE)

(72) Inventors: Klaus Lerchenmueller, Rettenberg (DE); Martin Lerner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 217 days.

(21) Appl. No.: 14/370,437

(22) PCT Filed: Nov. 22, 2012

(86) PCT No.: PCT/EP2012/073308
§ 371 (c)(1),
(2) Date: Jul. 2, 2014

(87) PCT Pub. No.: WO2013/102510
PCT Pub. Date: Jul. 11, 2013

(65) Prior Publication Data
US 2015/0070004 A1    Mar. 12, 2015

(30) Foreign Application Priority Data

Jan. 4, 2012  (DE) .................. 10 2012 200 092

(51) Int. Cl.
*G01B 7/30* (2006.01)
*G01P 3/48* (2006.01)
(Continued)

(52) U.S. Cl.
CPC ............. *G01P 3/49* (2013.01); *F01D 17/06* (2013.01); *F02C 6/12* (2013.01); *G01B 7/30* (2013.01);
(Continued)

(58) Field of Classification Search
CPC ... G01P 3/49; G01P 3/487; G01P 3/44; G01D 11/245
(Continued)

(56) References Cited

U.S. PATENT DOCUMENTS

| | | | |
|---|---|---|---|
| 5,486,758 A * | 1/1996 | Hammerle | G01D 5/2006 324/173 |
| 6,106,151 A | 8/2000 | Johannesson | |

(Continued)

FOREIGN PATENT DOCUMENTS

| | | |
|---|---|---|
| DE | 38 26 023 | 2/1989 |
| DE | 196 23 236 | 12/1997 |

(Continued)

OTHER PUBLICATIONS

Konrad Reif (publisher): *Sensoren im Kraftfahrzeug* [Sensors in the Motor Vehicle], 1st edition 2010, pp. 63-73.
(Continued)

*Primary Examiner* — Reena Aurora
(74) *Attorney, Agent, or Firm* — Gerard Messina

(57) ABSTRACT

A sensor device is described for the contactless acquisition of a rotatable object, in particular for acquiring a rotational speed of a compressor wheel of a turbocharger. The sensor device includes a sensor housing. The sensor device also includes at least one magnetic-field generator for generating a magnetic field at the location of the rotatable object, and at least one magnetic-field sensor for detecting a magnetic field generated by eddy currents of the rotatable object. The sensor device furthermore includes at least one connection element, the connection element being set up to connect the sensor device to a device that includes the rotatable object, especially a turbocharger, so that the magnetic-field generator and the magnetic-field sensor are at least partially disposed together in a sensor section of the sensor housing, (Continued)

and the sensor housing is at least regionally set apart from the device that includes the rotatable object.

15 Claims, 5 Drawing Sheets

(51) Int. Cl.
G01P 3/49 (2006.01)
G01P 3/44 (2006.01)
G01D 11/24 (2006.01)
F01D 17/06 (2006.01)
F02C 6/12 (2006.01)
G01P 3/495 (2006.01)

(52) U.S. Cl.
CPC .............. *G01D 11/245* (2013.01); *G01P 3/44* (2013.01); *G01P 3/495* (2013.01); *F05D 2220/40* (2013.01)

(58) Field of Classification Search
USPC .............................................. 324/207.25, 174
See application file for complete search history.

(56) References Cited

U.S. PATENT DOCUMENTS

| 2005/0017709 | A1 | 1/2005 | Stolfus et al. |
| 2005/0280412 | A1 | 12/2005 | Roeseler et al. |
| 2007/0119249 | A1 | 5/2007 | Sillanpaa |
| 2007/0139044 | A1 | 6/2007 | Lamb et al. |
| 2009/0266073 | A1 | 10/2009 | Greentree |

FOREIGN PATENT DOCUMENTS

| DE | 101 41 930 | 3/2003 |
| DE | 10 2006 021430 | 11/2007 |
| DE | 10 2007 005769 | 8/2008 |
| DE | 10 2009 027853 | 1/2011 |
| EP | 1 211 500 | 6/2002 |
| EP | 1 879 032 | 1/2008 |

OTHER PUBLICATIONS

Konrad Reif (publisher): *Sensoren im Kraffahrzeug* [Sensors in the Motor Vehicle], 1st edition 2010, pp. 63-73.

* cited by examiner

SENSOR DEVICE FOR THE CONTACTLESS ACQUISITION OF A ROTATION CHARACTERISTIC OF A ROTATABLE OBJECT

FIELD OF THE INVENTION

The present invention relates to a sensor device for providing contactless acquisition of a rotation characteristic of a rotatable object.

BACKGROUND INFORMATION

Numerous sensors that acquire at least one rotation characteristic of rotatable, especially rotating, objects are believed to be understood from the related art. In principle, rotation characteristics are characteristics that at least partially describe the rotation of the rotatable object. For example, these may be angular velocities, rotational speeds, angular accelerations, angles of rotation, angular positions or other characteristics that can characterize a continuous or discontinuous, even or uneven rotation of the rotatable object.

Examples of such sensors are discussed in Konrad Reif (publisher): *Sensoren im Kraftfahrzeug* [Sensors in the Motor Vehicle], 1st edition 2010, pages 63-73. A particular focus of the present invention, although not restricted thereto in principle, is a rotational speed acquisition, especially the rotational speed acquisition of charge devices, in particular in exhaust-gas turbochargers. This rotational speed acquisition may specifically be set up to acquire a rotational speed of a rotor of the exhaust-gas turbocharger. This rotor is typically provided with a plurality of compressor blades and may therefore also be referred to as a compressor wheel.

A device for rotational speed acquisition for a charge device, especially a rotor of an exhaust-gas turbocharger, is discussed in publication DE 10 2007 005 769 A1. Here, permanent magnets and a sensor circuit are employed separately, which are placed in physically different locations. A housing is used, which includes the rotor and is manufactured from a plastic material, in which the permanent magnets are embedded as insertion parts. The sensor circuit is accommodated in a recess on an outer side of the wall of the housing.

Other devices known from the related art typically use a cylindrical sensor, which has the smallest possible diameter and is introduced into a bore of the housing from the outside. Since the high temperatures in the vicinity of the compressor wheel usually exclude the use of conventional semiconductor components, a thermal decoupling of the sensor housing from the housing of the compressor wheel would be desirable.

Despite the numerous advantages of the previously known rotational speed acquisition devices, there is consequently still room for improvement.

SUMMARY OF THE INVENTION

Accordingly, a sensor device for the contactless acquisition of a rotation characteristic of a rotatable object is provided, which is at least for the most part able to avoid the drawbacks of known methods and strategies, and in which a thermal decoupling is provided between the sensor housing and a compressor housing.

A sensor device for the contactless acquisition of a rotation characteristic of a rotatable object, in particular for acquiring a rotational speed of a compressor wheel of a turbocharger, includes a sensor housing. In addition, the sensor device includes at least one magnetic-field generator for generating a magnetic field at the location of the rotatable object, and at least one magnetic-field sensor for detecting a magnetic field generated by eddy currents of the rotatable object. Moreover, the sensor device includes at least one connection element, which is set up to connect the sensor device to a device that includes the rotatable object, especially a turbocharger, in such a way that the magnetic-field generator and the magnetic-field sensor are at least partially disposed together in a sensor section of the sensor housing, and the sensor housing is at least regionally set apart from the device that includes the rotatable object.

The magnetic-field generator may be aligned along an axis, and a longitudinal axis of the sensor section may essentially extend in parallel with the axis of the magnetic-field generator. The sensor section is developed in such a way that in a state of the sensor housing in which it is mounted on the device that includes the rotatable object, one part of the device is situated between the sensor section and the rotatable object in a direction that runs essentially parallel to the longitudinal axis of the sensor section. The dimension of the part of the device in the direction of the longitudinal axis may range from 0.1 mm to 2 mm, which may be from 0.2 mm to 1.8 mm, and even more may be, from 0.5 mm to 1 mm. The sensor section may be introduced into a receptacle in a wall of the device, and in the introduced state a gap may be situated between the sensor section and the part of the device in the direction of the longitudinal axis of the sensor section. The sensor section may be introduced into a recess in a wall of the device, and in the introduced state a coaxial gap may at least regionally be situated between the wall of the device and the sensor section. The sensor housing may include spacers which touch the device in a state of the sensor housing in which it is mounted on the device that includes the rotatable object. The sensor housing may include segments and/or circular projections which touch the device in a state of the sensor housing in which it is mounted on the device that includes the rotatable object. The object may be rotatable about a pivot axle, and in a state of the sensor housing in which it is mounted on the device, the longitudinal axis of the sensor section may be disposed at an angle of 25° to 65° and, especially may be, 30° to 60°, and even more may be, 45° in relation to the pivot axle. The magnetic-field sensor may be an inductive magnetic-field sensor, and the sensor device may be set up to acquire a rotational speed of the rotatable object.

The sensor section may be developed as a non-magnetic sleeve, the sleeve may be at least partially of from stainless steel. The sensor housing may be made of plastic. The sensor device could be a rotational speed sensor, and the rotatable object a compressor wheel of a charger, especially of an exhaust-gas turbocharger. The sensor device may include an amplifier, which is set up to amplify a signal supplied by the magnetic-field sensor. A sensor system can include at least one of the afore-described sensor devices and additionally encompass a device that includes a rotatable object, the sensor device being mounted on the device that includes the rotatable object in such a way that the sensor housing is at least regionally set apart from the device that includes the rotatable object.

The magnetic-field sensor in particular can include at least one coil, which offers the advantage that large sensor surfaces are able to be realized with the aid of coils. At the same time, the use of coils makes it possible to avoid temperature sensitivities, which occur in semiconductor magnetic-field sensors or magnetoresistive sensors, for example. The coil, for instance, may be a flat coil and may have a coil cross-section having a winding area that may be planar or also curved, which may exceed a coil height of the coil, e.g., along an axis of the coil. In particular, the magnetic-field generator may have a permanent magnet, such as precisely one, two, three or more permanent magnet(s). It may in particular be at least partially enclosed by the magnetic-field sensor. This can be accomplished in that the coil encloses the permanent magnet completely or partially, for example. The permanent magnet may also have a rectangular and/or an oval form, for instance, featuring a longer side or longer semi-axis in a plane that includes the axis of the rotatable object.

Within the scope of the present invention, rotation characteristics are basically characteristics that at least partly describe the rotation of the rotatable object. For instance, these may be angular velocities, rotational speeds, angular accelerations, angles of rotation, angular positions or other characteristics that could characterize a continuous or discontinuous, even or uneven rotation or turning of the rotatable object.

Within the framework of the present invention, the expression "essentially in parallel" with reference to a direction describes a deviation of what may be maximally 15°, especially maximally 10°, especially maximally 5° and, especially may be, 0°, from the direction to which is referred.

Within the framework of the present invention, when angles between two directions or axes are indicated, this refers to an angle between the directions or axes, the axes theoretically intersecting, so that with the exception of a rectangular arrangement with respect to each other, they define between them two angle pairs of different size, it always being the case in the present invention that an angle of the smaller angle pair is referred to.

A housing interior within the scope of the present invention specifically describes the particular space inside a housing of a sensor device for the contactless acquisition of a rotation characteristic of a rotatable object, in which the electronics are situated, such as the evaluation circuit and its electrical connections, so that this space may also be referred to as the electronics space.

The sensor device, for example, may be a rotational speed sensor. The rotational speed sensor, for instance, is made up of a passive sensor head or sensor section, an active signal amplifier/pulse shaper, a housing having a fastening bushing and a plug connector. For instance, the sensor head may include a magnetic circuit including an inductivity, e.g., a fine wire winding, on a coil shell. A holder may be situated within a sleeve of the sensor head and accommodate all individual parts of the sensor head together with the connection technology and a possibly provided temperature sensor element. The holder, for example, may be made completely or partially of plastic, using injection technology. The housing, including connector and lid, made of plastic, for instance, accommodates the sleeve, the holder, and the electronics and is used for the mechanical fixation of the components and for protection from media. An outer contour of the housing, especially in the area of a bearing surface, is appropriately configured for thermal decoupling. The signal amplifier in the housing, which, for example, on a board having analog and/or digital components that may be integrated in an application-specific integrated circuit (ASIC), for instance, processes the rotational speed signal and, for example, forwards it to an engine control unit via the plug connection. A fastening bushing, which may be integrated into the housing and embodied thereby in the form of a projection, is provided for the mechanical fixation on a compressor housing, for example.

The sensor device according to the present invention reduces the thermal loading of the sensor region, which in this case may be embodied as an attachment of a rotational speed sensor on a compressor housing. For one, this makes it possible not to exceed the thermal operating limits of an integrated electronics system and, for another, to . . . the costs of the utilized materials by employing conventional plastics as they are frequently used in automobiles these days. This increases the service life of the sensor device and makes it possible to reduce the specification requirements. In addition, this proposes a virtually space-neutral approach. For example, by appropriate shaping in plastic tools, the sensor device according to the present invention may represent a cost-neutral solution.

No additional components or individual parts are furthermore required. The sensor section may include a sleeve made of stainless steel, which features a lower thermal conduction than brass or steel. The new geometry of the sensor device additionally allows a more optimal assembly and correct positional alignment. The created interspace, which is a function of the geometrical configuration, between sensor and compressor housing may reduce the heat input from the compressor housing into the sensor even further, e.g., by convection or an air flow at the engine or in the engine compartment. This additionally counteracts the temperature increase in the sensor during the high thermal loading when a hot engine is shut off following an operation under a full load. The housing contour required toward this end may be created via the configuration of the sensor housing; no changes take place in the injection molding technology. As a result of the constructive measure according to the present invention, the sensor head or the sensor section dips deeply into the compressor housing. The sensor housing is screw-fitted with the compressor housing, but rests against the surface on the compressor housing only by a fraction of the surface via the optimized geometry of the sensor housing.

The heat conduction into the sensor housing is therefore reduced, and the maximum temperatures are reduced. The receptacle for the sensor section is developed in such a way, for example, that the interior region of the compressor channel in which the compressor wheel is disposed, is not penetrated and the scanning of the wings or blades of the compressor wheel takes place through the remaining wall of the receptacle in the compressor housing implemented from the outside. In different operating states and, in particular, under loading in limit ranges, such as in full loading of the Otto or Diesel engine or when a hot engine is shut off, high thermal loads may briefly occur in an exhaust-gas turbocharger. The sensor device according to the present invention markedly reduces the thermal loads of the components of the sensor device, especially the electronics.

Additional optional details and features of developments of the present invention result from the following description of exemplary embodiments, which are shown schematically in the figures.

DETAILED DESCRIPTION

Figure 1:
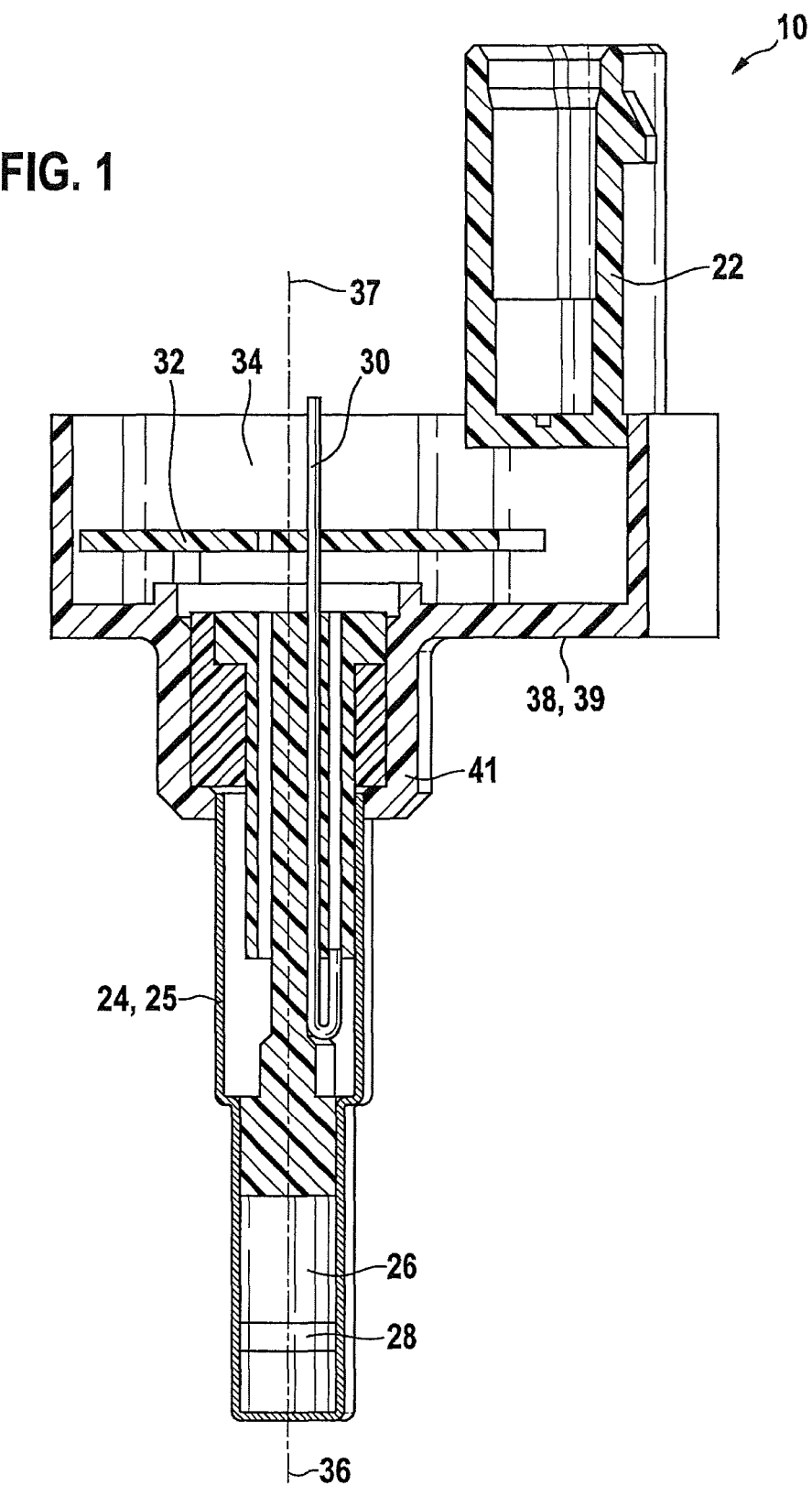
FIG. 1 shows a first exemplary embodiment of a sensor device according to the present invention.
Figure 2:
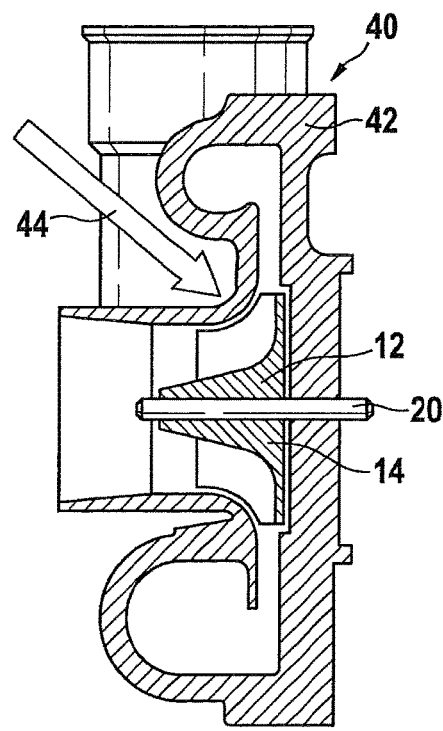
FIG. 2 shows a side view of a compressor housing.
Figure 3:
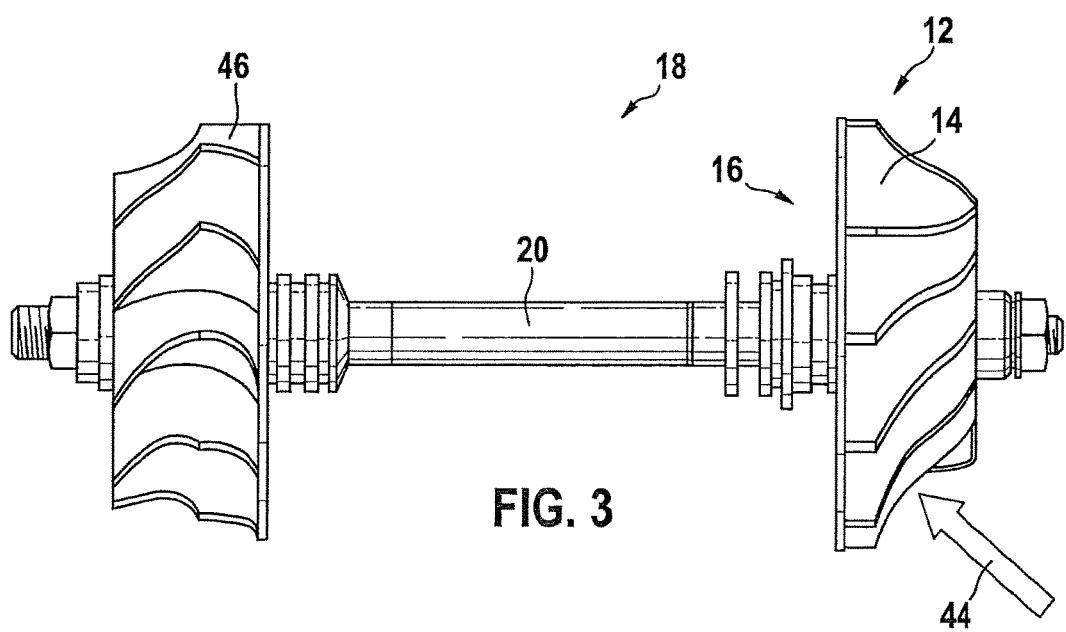
FIG. 3 shows a side view of the rotor assembly of an exhaust-gas turbocharger.

FIG. 1 shows a first exemplary embodiment of a sensor device 10 according to the present invention for the contactless acquisition of at least one rotation characteristic of a rotatable object 12 (FIG. 2). As illustrated in FIGS. 2 and 3, in this exemplary embodiment rotatable object 12 is a compressor wheel 14 of a compressor 16 of an exhaust-gas turbocharger 18, which turns, especially rotates, about a pivot axis 20. Sensor device 10, for instance, is embodied as a rotational speed sensor, which detects a rotational frequency of the compressor wheel. However, other uses and application fields are in principle possible as well.

Sensor device 10 includes a sensor housing 22, which may at least partially be manufactured from plastic and has a sensor section 24, which at least partially be may made of stainless steel. Sensor section 24 in particular is developed as a non-magnetic sleeve 25. Jointly disposed in sensor section 24 are at least one magnetic-field generator 26, which could be realized in the form of a permanent magnet, and a magnetic-field sensor 28, which may be mounted together on a holder. Magnetic-field generator 26 is developed to generate a magnetic field, which may be a static magnetic field, at the location of rotatable object 12, which induces eddy currents in rotatable object 12.

Magnetic-field sensor 28 may be developed as a coil. Magnetic-field sensor 28 is provided to detect a magnetic field generated by eddy currents of rotatable object 12. An electric connection, especially electrical supply lines 30, and/or connection elements, especially plug-in contacts, may be situated in sensor section 24, just like magnetic-field sensor 28 and magnetic-field generator 26. Supply lines are connected to a circuit substrate 32 such as a circuit board, which is situated in a housing interior 34. Magnetic-field generator 26 may be aligned along an axis 36 that coincides with a longitudinal axis 37 of sensor section 24. For example, sensor section 24 may be developed in rotational symmetry about longitudinal axis 37. More specifically, sensor section 24 projects in an essentially perpendicular manner from an underside 38 of sensor housing 22. Underside 38 may be developed as bearing surface 39, for instance, by way of which sensor housing 22 rests at least partially against device 40 in a state in which sensor device 10 is mounted on device 40 that accommodates rotatable object 12. Sensor section 24, in particular, may project from a projection 41 on underside 38 of sensor housing 22 that coaxially surrounds sensor section 24 regionally, i.e., not over the entire length of sensor section 24. Projection 41 is configured to center sensor section 24 in device 40. Projection 41 may coaxially surround sensor section 24 and thus support it in the radial direction. In addition, projection 41 may be developed as part of a fixation bushing or as a fixation bushing, which is integratable into sensor housing 22. For example, projection 41 may be a sleeve made of metal, which is extrusion-coated by plastic and provided with an outer thread developed for screwing sensor housing 22 into device 40.

As illustrated in FIG. 2, rotatable object 12 is situated or accommodated inside a device 40 which includes a compressor housing 42. Compressor housing 42 may at least partially be produced from a cast aluminum alloy. In addition, an arrow 44 in FIG. 2 indicates a possible installation position of sensor device 10 on compressor housing 42.

As illustrated in FIG. 3, an exhaust-gas turbocharger 18 generally includes a turbine wheel 46, which is drivable by flowing exhaust gas and connected to pivot axle 20; when turbine wheel 46 is turning, compressor wheel 14, which is likewise connected to pivot axis 20, is turning as well. The possible installation position of sensor device 10 on compressor housing 42 once again is indicated by arrow 44 in FIG. 3.

Figure 4:
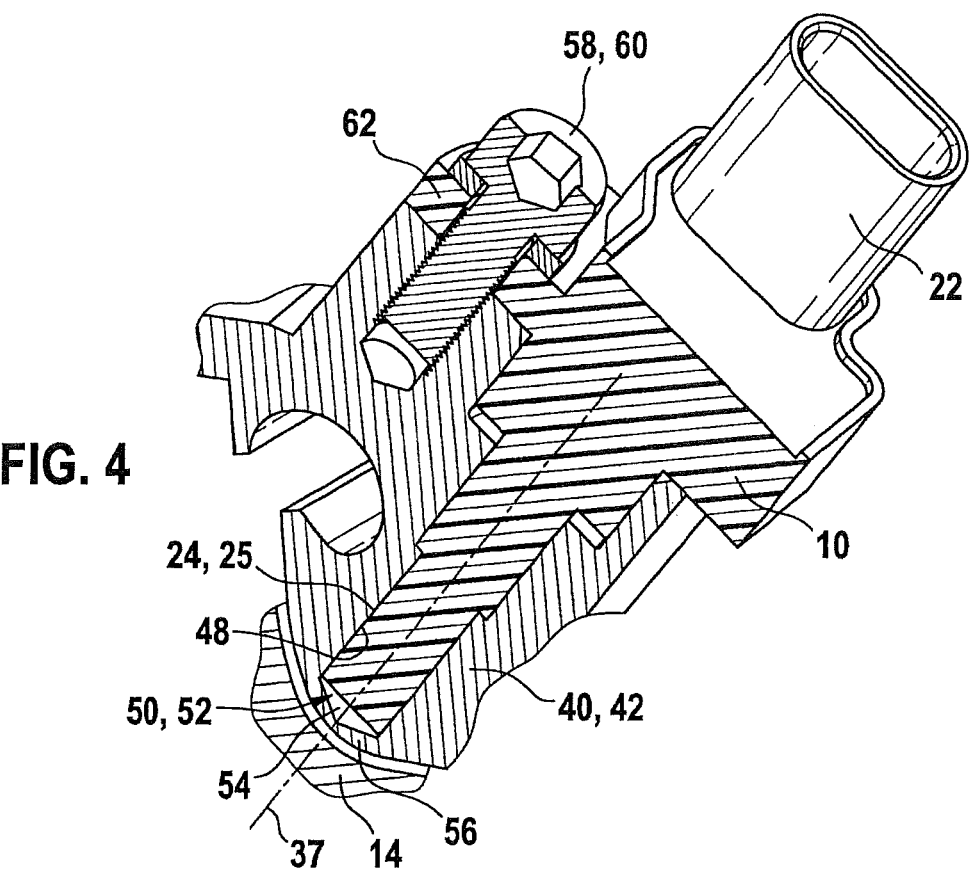
FIG. 4 shows a perspective sectional view of the sensor device in a state in which it is secured on a compressor housing.

As illustrated in FIG. 4, compressor housing 42 has a receptacle 48, which is developed, in the form of a blind hole or bottom hole. To mount sensor device 10 on compressor housing 42, sensor section 24 is inserted into receptacle 48; in so doing, a gap 54 is situated between an end 50 of sensor section 24 facing away from sensor housing 22, which constitutes a front end 52 of sensor section 24, and a part 56 of the wall of compressor housing 42 in the direction of longitudinal axis 37 of sensor section 24. Gap 54, for example, may have a dimension of 0.2 mm to 0.3 mm in the direction of longitudinal axis 37 of sensor section 24. The air situated in gap 48 between part 56 of the wall of compressor housing 42 and front end 52 of sensor section 24 induces thermal insulation, since air has poorer thermal conductivity than the mentioned materials of compressor housing 42 and sensor section 24. Furthermore, a coaxial gap may be present between sensor section 24 and the wall sections of compressor housing 42 defining receptacle 48; this gap is likewise used for the thermal decoupling and may extend over the entire length or a partial length of sensor section 24 in the direction of longitudinal axis 37. Further details regarding the gap will be discussed in greater detail in the following text. For the final installation, sensor housing 22 is fixed in place on compressor housing 42 with the aid of a fastening arrangement 58. This fastening arrangement 58, for instance, may be developed in the form of a screw 60, which is inserted through a flange 62 on sensor housing 22. A sleeve made of metal or brass, for example, may be introduced into flange 62, such as by an extrusion coating with plastic, the sleeve being developed to prevent screw 60 from exerting direct pressure on the plastic of sensor housing 22 or flange 62 during the screw-fitting operation.

Figure 5:
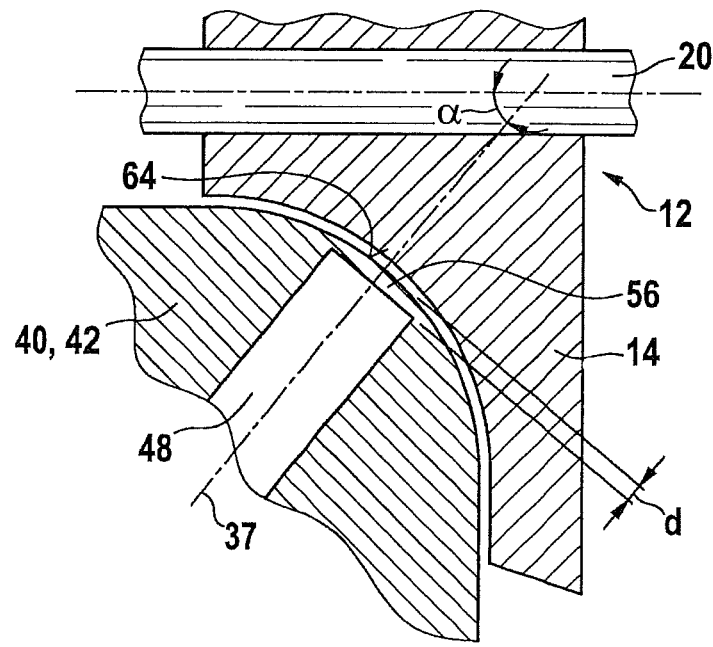
FIG. 5 shows an enlarged detail of the compressor housing and the compressor wheel.

As illustrated in FIG. 5, compressor housing 42 is configured in such a way that a surface 64 of sensor housing 22 facing compressor wheel 14 has a curved profile, which may be a curved profile that is adapted to a curvature of compressor wheel 14. A curved profile means a non-planar profile. An adapted profile is a profile in which a distance between surface 64 and rotating compressor wheel 14 is essentially constant in at least one direction on surface 64 over at least a certain distance or area, for example in that this distance does not vary by more than 20%, which may be by no more than 10%, over a distance of at least 1 cm, which may be at least 2 cm. The distance between surface 64 and compressor wheel 14, for instance, may be 0.05 mm to 0.3 mm and which may be, 0.1 mm, for example.

FIG. 5 furthermore illustrates that part 56 of the wall of compressor housing 42 is disposed between receptacle 48 and compressor wheel 14. Part 56 may have a dimension d of 0.1 mm to 2 mm, which may be 0.2 mm to 1.8 mm, and even more may be, 0.5 mm to 1 mm, e.g., 0.5 mm, in the direction of longitudinal axis 37 of sensor section 24; it is selected as small as possible in order to keep interference effects on the magnetic-field detected by magnetic-field sensor 28 to a minimum. In other words, it is desired that magnetic-field sensor 28 is able to detect a magnetic field generated by eddy currents of rotatable object 12 without or with little attenuation, if possible. Receptacle 48 in particular may be configured in such a way that front end 52 of sensor section 24 is positioned as closely as possible to the passing compressor blades of compressor wheel 14. In addition, FIG. 5 illustrates that sensor section 24 may be mounted on compressor housing 42 so that longitudinal axis 37 is disposed at an angle α of 25° to 65°, which may be 30° to 60°, and even more may be, 45°, e.g., precisely 45°, in relation to pivot axle 20. Because of part 56 of the wall of compressor housing 42, the influencing of the magnetic field generated by eddy currents of rotatable object 12 decreases with increasing dimension d in the direction of longitudinal axis 37, which may also be referred to as thickness. Sensor device 10 may therefore include a signal amplifier, which is mounted on or included in circuit substrate 32. This amplifies the detected magnetic field and, for example, the voltage signal that goes hand-in-hand with this magnetic field.

Without amplifier, it may happen, for instance, that only voltages in a range of a few mV could be picked off at magnetic-field sensor 28. Because of the amplifier, however, voltages of several volts, e.g., 5 V to 12 V, are able to be picked off for a precise analysis.

The acquisition of the rotation characteristic of rotatable object 12 in sensor device 10 may be based on the fact that magnetic-field generator 26 generates a magnetic field, especially a static magnetic field, at the location of rotatable object 12. In a turn, especially a rotation, of rotatable object 12, which in this instance is a compressor wheel 14 which turns, especially rotates, about pivot axle 20, eddy currents are produced, which affect, especially change, the magnetic field and, in particular, the magnetic flux. The voltage able to be tapped off at magnetic-field sensor 28 is proportional to the temporal change of a magnetic flux at magnetic-field sensor 28.

Figure 6:
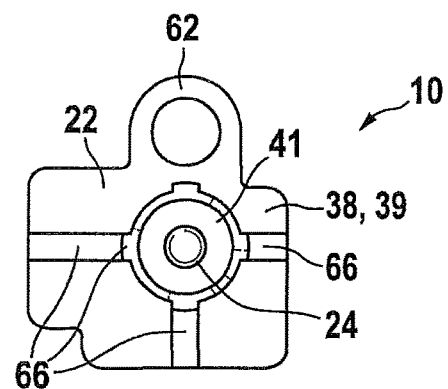
FIG. 6 shows a view from below of a sensor device according to a first modification.

FIG. 6 illustrates a view from below of sensor housing 22 and its bearing surface 38 according to one possible modification of sensor device 10. As shown in FIG. 6, multiple segments 66 may be disposed at bearing surface 38. For example, three segments 66 may be provided, which are disposed at a right angle to each other on bearing surface 38 around projection 41. Segments 66 in particular project from bearing surface 38 in the direction of longitudinal axis 37.

Figure 7:
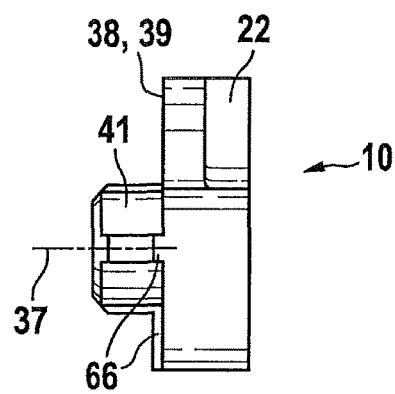
FIG. 7 shows a side view of a sensor device according to the first modification.

FIG. 7 shows a corresponding side view of the first modification of sensor device 10. There, too, segments 66 are easy to see. In addition, FIG. 7 illustrates that segments 66 have a smaller dimension than projection 41 in the direction of longitudinal axis 37.

Figure 8:
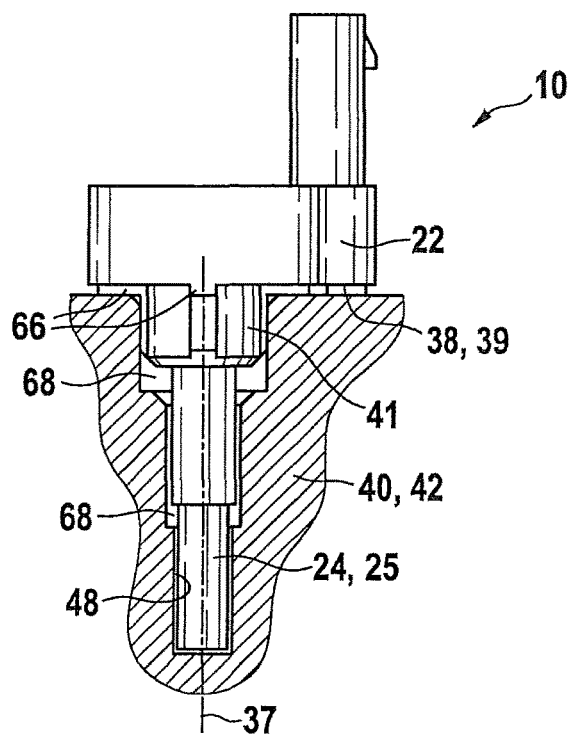
FIG. 8 shows a side view of the sensor device according to the first modification, in a state in which it is mounted on a compressor housing.

FIG. 8 shows the placement of sensor device 10 according to the first possible modification on compressor housing 42. Because of segments 66, bearing surface 39 does not rest directly on compressor housing 42, but is set apart from it, since segments 66 act as spacers. The distance of bearing surface 39 of sensor housing 22 to compressor housing 42 may be 1 mm, for example, and ensures that a certain air volume is able to pass through between bearing surface 39 and, in particular, underside 38 of sensor housing 22 and compressor housing 42. This provides a thermal decoupling between sensor housing 22 and compressor housing 42, at whose surface facing sensor housing 22 temperatures of approximately 150° may prevail. As a result, sensor housing 22 lies against compressor housing 42 only by a portion of bearing surface 39. FIG. 8 also shows that a coaxial gap 68 is situated between sensor section 24 and compressor housing 42 in receptacle 48. In other words, the diameter of receptacle 48 is slightly larger than the diameter of sensor section 24. This likewise provides a thermal decoupling, since sensor section 24 does not have any direct contact with compressor housing 42 within receptacle 48. It should furthermore be noted that housing 42 is typically produced from a cast aluminum alloy, and sensor section 24, produced from stainless steel, thus has a lower thermal conductivity. A heat transfer from compressor housing 42 to magnetic-field generator 26 and magnetic-field sensor 28 in the interior of sensor section 24 is thereby reduced. The thermal loading of magnetic-field generator 26 and magnetic-field sensor 28 consequently is lower than in sensor devices in which a receptacle is implemented as through hole and/or through bore and/or in which the sensor section rests against the walls of the receptacle.

Figure 9:
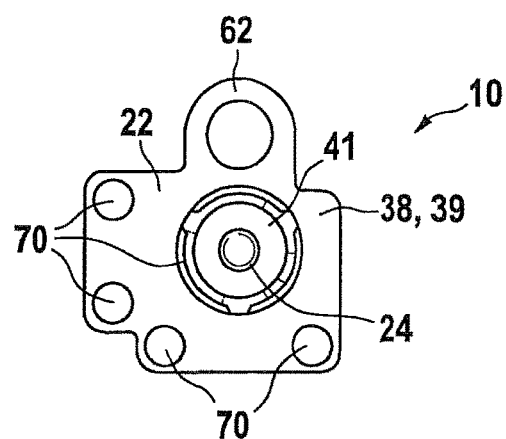
FIG. 9 shows a view from below of a sensor device according to a second modification.

FIG. 9 shows a sensor device 10 according to a second possible modification, in a view from below. Only the differences in comparison to the first possible modification are described, and identical components have been furnished with matching reference numbers. In sensor device 10 according to the second possible modification, circular spacers 70 have replaced segments 66. Spacers 70 are situated on bearing surface 39 and may project from underside 38 by the same dimension as segments 66. For example, four spacers 70 are provided, which are distributed at the outer edge regions of underside 38.

Figure 10:
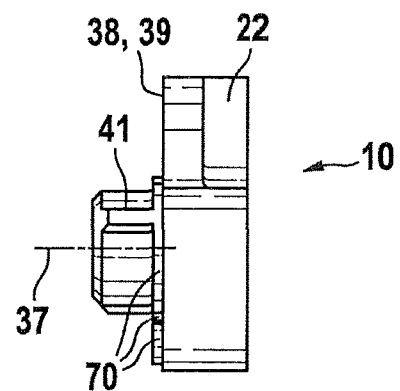
FIG. 10 shows a side view of a sensor device according to the second modification.

FIG. 10 shows a corresponding side view of the second modification of sensor device 10. There, too, spacers 70 are easy to see. As illustrated in FIG. 10, circular spacers 70 are disposed on bearing surface 39 in a distributed manner. In addition, FIG. 10 shows that spacers 70 have a smaller dimension than projection 41 in the direction of longitudinal axis 37.

Figure 11:
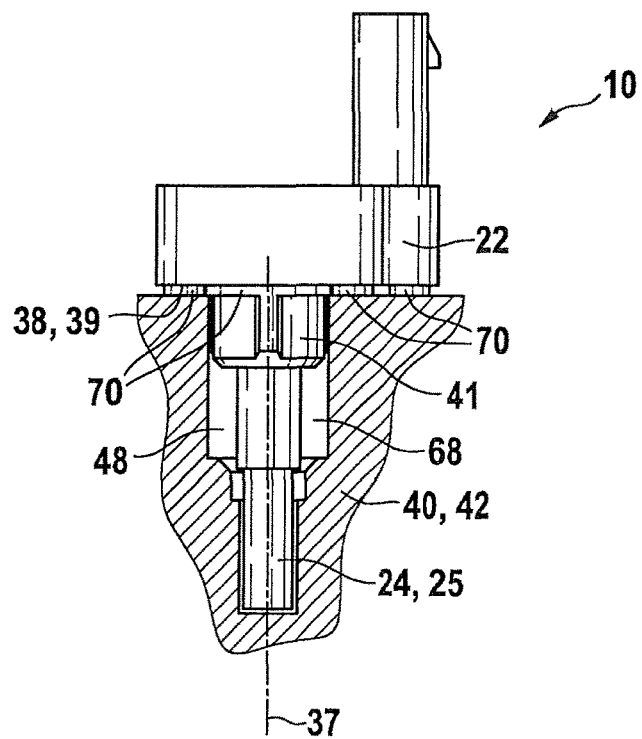
FIG. 11 shows the sensor device according to the second modification, in a state in which it is mounted on a compressor housing.

FIG. 11 shows the placement of sensor device 10 according to the second possible modification, in a state in which it is mounted on compressor housing 42. Sensor section 24 is situated in receptacle 48, the diameter of receptacle 48 possibly being larger than the diameter of sensor section 24, so that a coaxial gap 68 exists between compressor housing 42 and sensor section 24 in the second modification as well, this gap ensuring a thermal decoupling since sensor section 24 has no direct contact with compressor housing 42.

It is explicitly noted that all features disclosed in the description and/or in the claims are to be considered separate and mutually independent features for the purpose of the original disclosure and also for the purpose of restricting the claimed invention, independently of the feature combinations in the specific embodiments and/or the claims. It is explicitly stated that all indicated ranges or the specifications of groups of units disclose any possible intermediate value or subgroup of units for the purpose of the original disclosure and also for the purpose of restricting the claimed invention, especially also as limitation of an indicated range.

What is claimed is:

1. A sensor device for providing contactless acquisition of a rotation characteristic of rotatable object, comprising:
   a sensor housing;
   at least one magnetic-field generator to generate a magnetic field at the location of the rotatable object;
   at least one magnetic-field sensor to detect a magnetic field generated by eddy currents of the rotatable object and
   at least one connection element set up to connect the sensor device to a device that includes the rotatable object, so that the magnetic-field generator and the magnetic-field sensor are at least partially disposed together in a sensor section of the sensor housing, and the sensor housing is set apart from the device that includes the rotatable object;
   wherein the sensor section is in the form of a non-magnetic sleeve;
   wherein the sensor section is introduce-able into a receptacle in a wall of the device, and a coaxial air gap is situated between the sensor section and a wall of the receptacle in the direction of the longitudinal axis of the sensor section in the introduced state; and
   wherein the receptacle is a blind hole in the wall of the device.

2. A sensor device for providing contactless acquisition of a rotation characteristic of a rotatable object, comprising:
   a sensor housing;
   at least one magnetic-field generator to generate a magnetic field at the location of the rotatable object;
   at least one magnetic-field sensor to detect a magnetic field generated by eddy currents of the rotatable object and
   at least one connection element set up to connect the sensor device to a device that includes the rotatable object, so that the magnetic-field generator and the magnetic-field sensor are at least partially disposed together in a sensor section of the sensor housing, and the sensor housing is set apart, from the device that includes the rotatable object;
   wherein the sensor section is in the form of a non-magnetic sleeve;
   wherein the sensor section is introduce-able into a receptacle in a wall of the device, and in the introduced state a coaxial air gap is situated between a wall of the receptacle and the sensor section; and
   wherein the receptacle is a blind hole in the wall of the device.

3. The sensor device of claim 2, wherein the magnetic-field generator is aligned along an axis, and a longitudinal axis of the sensor section essentially extends in parallel with the axis of the magnetic-field generator, the sensor section being configured so that in a state of the sensor housing in which it is mounted on the device that includes the rotatable object, a part of the device is located between the sensor section and the rotatable object in a direction that runs essentially parallel to the longitudinal axis of the sensor section.

4. The sensor device of claim 3, wherein the object is rotatable about a pivot axle, and in a state of the sensor housing in which it is mounted on the device, the longitudinal axis of the sensor section is disposed at an angle of 25° to 65°, in relation to the pivot axle.

5. The sensor device of claim 2, wherein the dimension of the part of the device in the direction of the longitudinal axis of the sensor section ranges from 0.1 mm to 2 mm.

6. The sensor device of claim 2, wherein the sensor housing includes spacers which touch the device in a state of the sensor housing in which it is mounted on the device that includes the rotatable object.

7. The sensor device of claim 2, wherein the sensor housing includes at least one of segments and circular projections which touch the device in a state of the sensor housing in which it is mounted on the device that includes the rotatable object.

8. The sensor device of claim 2, wherein the sensor device is a rotational speed sensor, and the rotatable object is a compressor wheel of a charger.

9. A sensor system, comprising:
   a sensor device; and
   a device that includes a rotatable object, the sensor device being mounted on the device that includes the rotatable object so that the sensor housing is at least regionally set apart from the device that includes the rotatable object;
   wherein the sensor device is for providing contactless acquisition of a rotation characteristic of the rotatable object, and includes:
      a sensor housing;
      at least one magnetic-field generator to generate a magnetic field at the location of the rotatable object;
      at least one magnetic-field sensor to detect a magnetic field generated by eddy currents of the rotatable object; and
      at least one connection element set up to connect the sensor device to the device that includes the rotatable object, so that the magnetic-field generator and the magnetic-field sensor are at least partially disposed together in a sensor section of the sensor housing, and the sensor housing is set apart, from the device that includes the rotatable object;
      wherein the sensor section is in the form of a non-magnetic sleeve;
      wherein the sensor section is situated in a receptacle in a wall of the device in such a way that a coaxial air gap is situated between a wall of the receptacle and the sensor section; and
      wherein the receptacle is a blind hole in the wall of the device.

10. The sensor system of claim 9, wherein the sensor device is for providing contactless acquisition of the rotation characteristic of the rotatable object, including the acquisition of a rotational speed of a compressor wheel of a turbocharger, and wherein the rotatable object includes the turbocharger.

11. The sensor system of claim 9, wherein the dimension of the part of the device in the direction of the longitudinal axis of the sensor section ranges from 0.2 mm to 1.8 mm.

12. The sensor system of claim 9, wherein the dimension of the part of the device in the direction of the longitudinal axis of the sensor section ranges from 0.5 mm to 1 mm.

13. The sensor system of claim 9, wherein the object is rotatable about a pivot axle, and the longitudinal axis of the sensor section is disposed at an angle of 30° to 60°, in relation to the pivot axle.

14. The sensor system of claim 9, wherein the object is rotatable about a pivot axle, and the longitudinal axis of the sensor section is disposed at an angle of 45°, in relation to the pivot axle.

15. The sensor system of claim 9, wherein the sensor device is a rotational speed sensor, and the rotatable object is a compressor wheel of a charger, which is an exhaust-gas turbocharger.

* * * * *